W. G. HUNTER.
CLOD CRUSHER AND LAND SMOOTHER.
APPLICATION FILED JUNE 28, 1912.
1,047,061.  Patented Dec. 10, 1912.
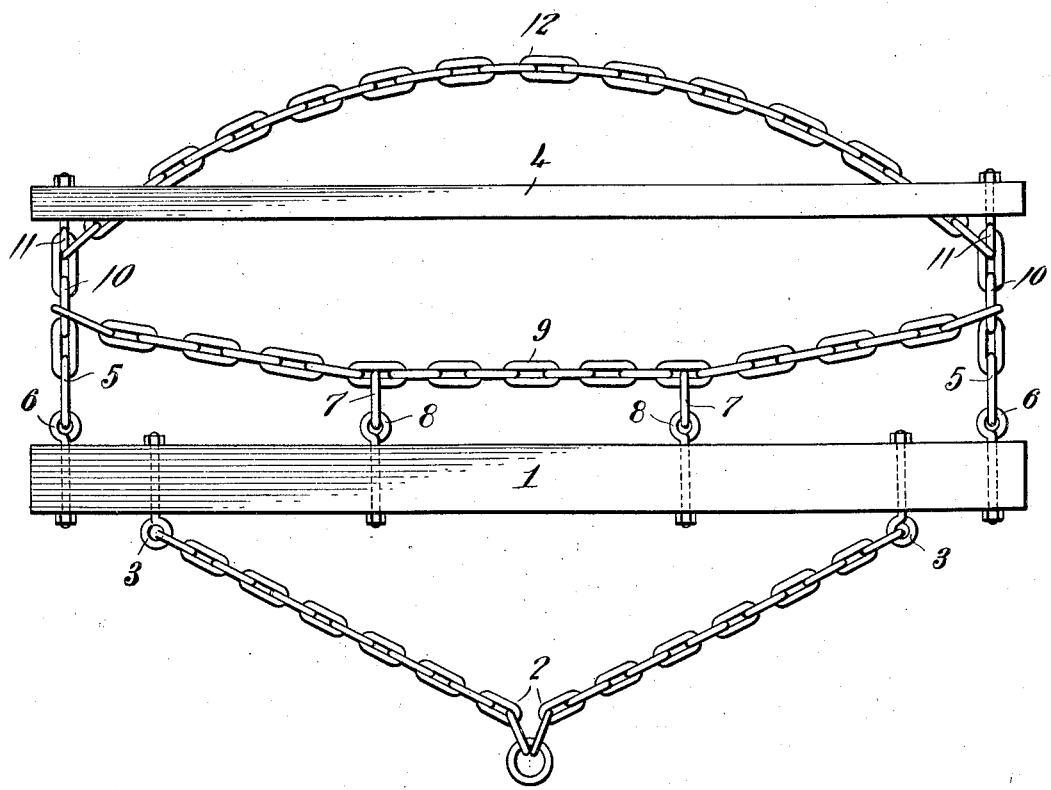
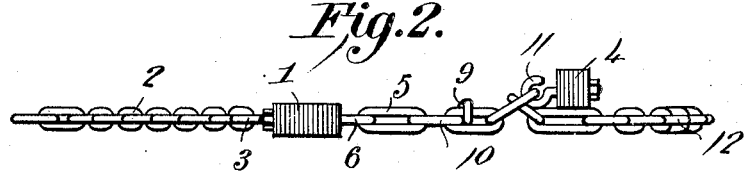
Witnesses
Carroll Bailey
J. W. Garner
Inventor
W. G. Hunter,
By Victor J. Evans
Attorney

UNITED STATES PATENT OFFICE.

WILLIAM G. HUNTER, OF NEBO, NORTH CAROLINA.

CLOD-CRUSHER AND LAND-SMOOTHER.

1,047,061. Specification of Letters Patent. Patented Dec. 10, 1912.

Application filed June 28, 1912. Serial No. 706,490.

*To all whom it may concern:*

Be it known that I, WILLIAM G. HUNTER, a citizen of the United States, residing at Nebo, in the county of McDowell and State of North Carolina, have invented new and useful Improvements in Clod-Crushers and Land-Smoothers, of which the following is a specification.

This invention is an improved clod crusher and land smoother adapted for use on plowed land for crushing clods and smoothing the surface and also adapted for leveling corn stalks, pea vines and the like growth so as to cause the same to be readily plowed under, the invention consisting in the construction, combination and arrangement of devices hereinafter described and claimed.

In the accompanying drawing:—Figure 1 is a plan of a clod crusher and land smoother constructed in accordance with my invention. Fig. 2 is a side elevation of the same.

In accordance with my invention, I provide an evener bar 1, of suitable dimensions, to which, near its ends, are attached the ends of a draft chain 2, eye bolts 3 being here shown to enable the draft chain to be connected to the evener bar.

At a suitable distance in rear of the evener bar is a spreader bar 4. Links 5 are connected to the ends of the evener bar, on the rear side thereof by means of eye bolts 6. Links 7 are also connected to the rear side of the evener bar, at points intermediate its ends by eye bolts 8. A front drag chain 9 is connected at intermediate points to the links 7 and is connected at its ends to connecting chains 10, the front ends of the said connecting chains being attached to the links 5 and their rear ends being connected to the spreader bar 4, at the ends of the latter, by means of hook bolts 11. Hence, the front drag chain is indirectly connected both at its ends and at intermediate points to the evener bar, the connecting chains 10 forming flexible connections between the evener bar and the spreader bar and adapting the said bars to play vertically, independently of each other and adapt themselves to inequalities of the earth's surface when the device is in use.

A rear drag chain 12 trails in rear of the spreader bar and is connected at its end to the rear ends of the connecting chains 10. The front and rear drag chains are of suitable length and weight and, in practice, the combined weight of these chains is usually about ninety or one hundred pounds.

When the device is drawn over a plowed field, the evener and spreader bars both bear directly on the surface and serve to smooth the same while the drag chains by their weight and flexibility serve to engage all portions of the surface and to effectually break up the clods, the device also serving, when drawn over a stubble or fallow field to break down and level all stalks, as of corn, and also all vines and the like so as to enable the same to be readily turned under when plowed.

While I have herein shown and described a preferred form of my invention, I would have it understood that changes may be made in the form, proportion and construction of the several parts without departing from the spirit of my invention and within the scope of the appended claim.

I claim:—

The herein described clod crusher and land smoother comprising an evener bar, a draft chain connected thereto near its ends, a spreader bar located in rear of the evener bar, connecting chains between the ends of the evener and spreader bars, a front drag chain connected at its ends to the connecting chains and at intermediate portions of the rear side of the evener bar, and a rear drag chain trailed in rear of the spreader bar connected at its ends to the connecting chains.

In testimony whereof I affix my signature in presence of two witnesses.

WILLIAM G. HUNTER.

Witnesses:
  MILLARD C. SIGMON,
  JOSEPH L. PADGETT.